No. 615,759. Patented Dec. 13, 1898.
E. C. SMITH.
PNEUMATIC HUB FOR VEHICLE WHEELS.
(Application filed Feb. 26, 1898.)
(No Model.)
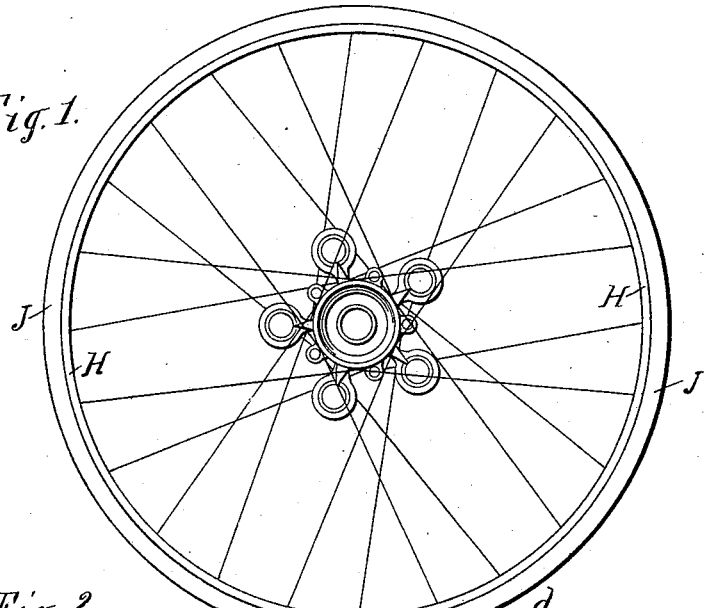
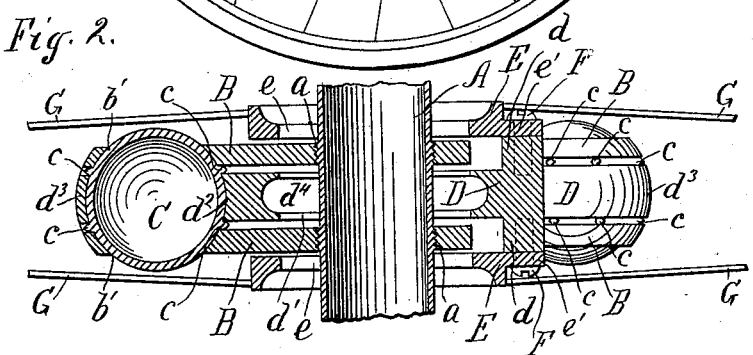
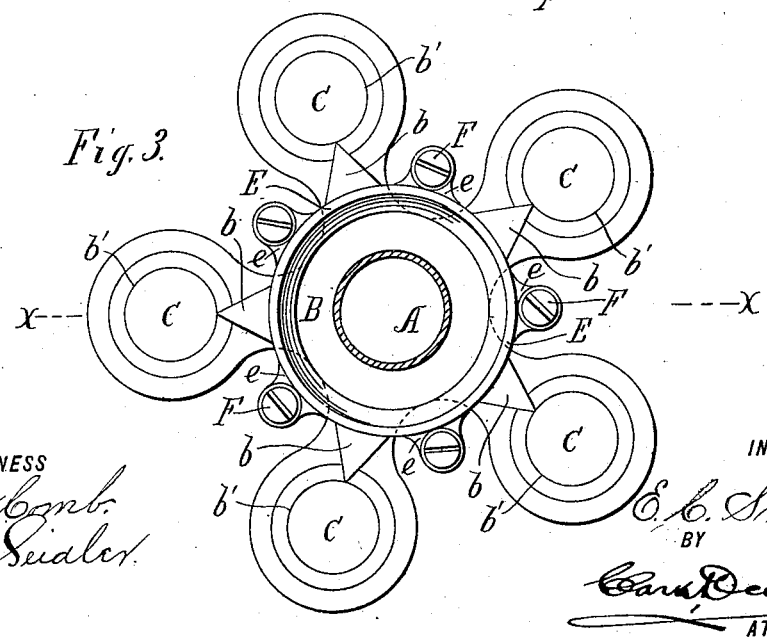
WITNESS
INVENTOR
ATTORNEYS

UNITED STATES PATENT OFFICE.

EDWARD CURRAN SMITH, OF SCHENECTADY, NEW YORK, ASSIGNOR OF ONE-HALF TO CHARLES W. JEFFERSON, OF SAME PLACE.

PNEUMATIC HUB FOR VEHICLE-WHEELS.

SPECIFICATION forming part of Letters Patent No. 615,759, dated December 13, 1898.

Application filed February 26, 1898. Serial No. 671,770. (No model.)

*To all whom it may concern:*

Be it known that I, EDWARD CURRAN SMITH, a citizen of the United States, and a resident of Schenectady, county of Schenectady, and State of New York, have invented certain new and useful Improvements in Pneumatic Hubs for Vehicle-Wheels, of which the following is a specification, reference being had to the accompanying drawings, forming a part thereof, in which similar letters of reference indicate corresponding parts.

This invention relates to an improvement in pneumatic hubs for vehicle-wheels; and the object thereof is to provide a simple and effective device which shall take up the vibration caused by the rolling of the wheel over inequalities of the ground and preventing the transmission of the vibration to the frame of the vehicle through the medium of the axle.

The invention consists, primarily, in the employment of a series of pneumatic spheres arranged concentrically with the wheel-hub and adapted to be independently inflated.

The invention will be hereinafter fully described, and specifically set forth in the annexed claims.

In the accompanying drawings, Figure 1 is a side elevation of the device in position in the type of wheel usually employed in bicycles or other light vehicles. Fig. 2 is a sectional view of the hub upon an enlarged scale and on the line $x\,x$ of Fig. 3. Fig. 3 is a side elevation of the same.

In applying my invention I employ a shell A, which in the case of a bicycle-wheel would be fitted with the usual ball-bearings in the interior thereof at each end; but if employed on a heavier vehicle the axle would project through said shell and means for lubricating the same would be provided. A thread $a$ is formed upon the periphery of said shell, and upon said thread are screwed the retaining-plates B B. The said retaining-plates may be keyed or otherwise fastened to said shell in place of being screwed on, if desired; but the thread is at this time preferred. Said plates are provided with a series of projections $b$ equal in number to the number of pneumatic spheres employed in the device. Said projections are enlarged at their free ends and have suitable holes $b'$ cut therein, adapted to receive the pneumatic spheres C. Said spheres are preferably constructed of rubber and have a series of spurs $c$ arranged in parallel lines upon the exterior thereof. These spurs may be dispensed with, if so desired, and annular ribs employed in their place. Each of the spheres C is provided with a suitable valve of the ordinary type, by means of which they may be inflated and deflated.

A collar D, provided with a series of angular projections $d$, surrounds the shell A between the retaining-plates B B and is provided with a hole $d'$ sufficiently large to allow said collar to play freely in any direction on the shell A. At the point $d^2$, opposite the angular portion thereof, said collar contacts with the sphere retained between the plates B B. A band $d^3$, formed integrally with said collar, surrounds the central portion of the sphere. A space is left between the retaining-plates B and the collar D of sufficient width to accommodate the spurs $c$ of the pneumatic sphere C.

The plates E E, which are preferably of angular form, surround the shell A on the outer sides of the retaining-plates B B, sufficient space being left between said retaining-plates B B and the plates E E to allow free play of the parts. The plates E E have a hole centrally located therein of sufficient diameter to allow free play of the same in any direction on the shell A.

The plates E have a series of spurs $e'$ projected therefrom. Said spurs are provided with suitable holes, through which the screws F F are adapted to pass and thread into the angular portion of the collar D, thereby binding the plates E rigidly to the collar D.

Spokes G G may be attached to the plates E in any approved manner, said spokes being adapted to support the rim H. A cushioned tire J, preferably of rubber, may be affixed to said rim H.

In operation the spheres are deflated and inserted through the holes $b'$ of the plate B into position and then inflated. In case of accident, by means of which one of the spheres becomes disabled, it may be readily taken out when deflated and a new one inserted in its place. When strain is brought upon the device—as, for instance, when a load is placed upon the vehicle—it will readily be seen that the weight will be carried upon the retaining-plates B B. The tire rests upon the ground and through the medium of the rim the spokes and the plates E E, which are screwed fixedly to the collar D, which in turn rests upon the pneumatic spheres supported by the retaining-plates B B and is supported thereby. The projecting spurs $c\ c$ in the channels between the retaining-plates and the collar prevent the spheres from being displaced. As the vehicle passes over the ground and meets inequalities therein the wheel, with the plate C and the collar D, will accommodate themselves to the road over which they are traveling. For instance, when the wheel meets an obstruction and is lifted suddenly it will be found that the collar D, rigidly fixed to the wheel members, will compress two or more of the spheres when imparting their own motion to that of the shell A. As soon as the obstruction is passed the air within the spheres will return the various members of the device to their normal position, and this action will continue indefinitely so long as the spheres are kept full of air under pressure. The weight is not, however, all thrown upon one or two of the spheres, but is distributed equally among them, and the strain of shock is taken up by all in the same manner.

Any number of spheres may be employed, and they may be separated widely, as shown in Fig. 1, or located more closely, as shown in Fig. 3, as may be preferred. Their form may be changed without departing from the spirit of my invention, and the plates E may be formed in any manner desired to support the spokes.

Should it be desired, a rubber buffer in ring form may be inserted in the interior channel $d^4$ of the collar D to prevent contact between the inner periphery of said collar and the shell A in the event of an unusually heavy shock; but it is not considered necessary for ordinary use in light vehicles.

Manifestly any form of journal or axle may be employed in place of the shell A, and the wheel may or may not be provided with a cushioned tire of rubber or similar material.

Having thus described my invention, what I claim as new, and desire to secure by Letters Patent, is—

1. In a vehicle-wheel, the combination with the rim and spokes, of a hub fixed to said spokes, said hub being provided with a hole therethrough of a sufficient diameter to permit free action around the axle, an inner hub or shell adapted to revolve upon said axle, a support fixed to said shell and carrying a series of inflatable spheres, said hub being fixed to a collar surrounding said shell concentrically, said collar adapted for contact with said inflatable spheres, and means for retaining said spheres in position, substantially as shown and described.

2. In a vehicle-wheel, the combination of a shell adapted to revolve upon an axle, retaining-plates fixed thereto and provided with suitable holes therein to receive inflatable spheres, a series of inflatable spheres carried between said retaining-plates, said spheres being provided with a series of projecting spurs adapted to prevent displacement of said spheres, a loose collar arranged between said retaining-plates and concentrically with the shell and adapted for contact with the said spheres, said collar being provided with a series of angular projections, hubs or plates fixed to said projections and adapted to support the rim and tire of the wheel through the medium of a series of spokes, substantially as shown and described.

In testimony that I claim the foregoing as my invention I have signed my name, in presence of two witnesses, this 24th day of February, 1898.

EDWARD CURRAN SMITH.

Witnesses:
SYDNEY J. PRESCOTT,
B. McCOMB.